(12) United States Patent
Mashiko et al.

(10) Patent No.: US 12,531,189 B2
(45) Date of Patent: Jan. 20, 2026

(54) DIELECTRIC BODY, CAPACITOR, ELECTRIC CIRCUIT, CIRCUIT BOARD, AND DEVICE

(71) Applicant: Panasonic Intellectual Property Management Co., Ltd., Osaka (JP)

(72) Inventors: Hisanori Mashiko, Osaka (JP); Hideaki Adachi, Osaka (JP); Michio Suzuka, Kyoto (JP); Takehito Goto, Osaka (JP); Ryosuke Kikuchi, Osaka (JP); Manabu Kanou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 18/486,008

(22) Filed: Oct. 12, 2023

(65) Prior Publication Data
US 2024/0038452 A1     Feb. 1, 2024

Related U.S. Application Data

(63) Continuation of application No. PCT/JP2022/006017, filed on Feb. 15, 2022.

(30) Foreign Application Priority Data

Apr. 21, 2021   (JP) ................. 2021-072032

(51) Int. Cl.
*H01G 9/07* (2006.01)
*H01G 9/048* (2006.01)
*H01G 9/15* (2006.01)
*H01G 9/04* (2006.01)

(52) U.S. Cl.
CPC ............... *H01G 9/07* (2013.01); *H01G 9/048* (2013.01); *H01G 9/15* (2013.01); *H01G 2009/05* (2013.01)

(58) Field of Classification Search
CPC ........ H01G 9/048; H01G 9/0032; H01G 9/15; H01G 9/07
See application file for complete search history.

(56) References Cited

U.S. PATENT DOCUMENTS

| | | |
|---|---|---|
| 2005/0009361 A1 | 1/2005 | DeBoer et al. |
| 2005/0219803 A1 | 10/2005 | Takatani et al. |
| 2008/0047116 A1 | 2/2008 | Takatani et al. |

FOREIGN PATENT DOCUMENTS

| | | | |
|---|---|---|---|
| CN | 101114543 A | 1/2008 | |
| CN | 111905772 A | * 11/2020 | ............ B01J 37/088 |

OTHER PUBLICATIONS

Danish et al., Fabrication of tantalum oxyfluoride and oxynitride thin films via ammonolysis of sol-gel processed tetraethoxo (b-diketonato) tantalum (V) precursors for enhanced photocatalytic activity, Mar. 25, 2021, J Mater Sci: Mater Electron (2021) 32:10564-10578 (Year: 2021).*

International Search Report issued on May 17, 2022 in International Patent Application No. PCT/JP2022/006017, with English translation.

(Continued)

*Primary Examiner* — David M Sinclair
(74) *Attorney, Agent, or Firm* — Rimon P.C.

(57) ABSTRACT

A dielectric of the present disclosure includes a tantalum compound containing fluorine and oxygen and being amorphous, and is advantageous in terms of achieving a high dielectric constant.

18 Claims, 5 Drawing Sheets

(56) References Cited

OTHER PUBLICATIONS

Leilei Xu et al., "Complex-Mediated Synthesis of Tantalum Oxyfluoride Hierarchical Nanostructures for Highly Efficient Photocatalytic Hydrogen Evolution", ACS Applied Materials & Interfaces, vol. 8, Issue 14, 2016, pp. 9395-9404.

Stephanie Sawhill et al., "A near zero coefficient of thermal expansion ceramic: Tantalum oxyfluoride", Ceramics International, vol. 38, Issue 3, 2012, pp. 1981-1989.

Masanori Kodera, "Dielectric Properties of Oxyfluoride Thin Films with Rc(},-Lype Structure", Annual Report of the Murata Science Foundation, vol. 34, 2020, pp. 261-263, with English abstract.

Masanori Kodera et al., "Fabrication and characterization of ReO3-type dielectric films", Journal of Materials Chemistry C, Issue 14, 2020, pp. 4680-4684.

Extended European Search Report dated May 23, 2025 issued in the corresponding European Patent Application No. 22791344.9.

Renato V. Goncalves et al., "TaO5 Nanotubes Obtained by Anodization: Effect of Thermal Treatment on the Photocatalytic Activity for Hydrogen Production", The Journal of Physical Chemistry C, vol. 116, No. 26, pp. 14022-14030, 2012.

Renato V. Goncalves et al., "On the crystallization of Ta2O5 nanotubes: structural and local atomic properties investigated by EXAFS and XRD", CrystEngComm, vol. 16, No. 5, pp. 797-804, 2014.

* cited by examiner

DIELECTRIC BODY, CAPACITOR, ELECTRIC CIRCUIT, CIRCUIT BOARD, AND DEVICE

This application is a continuation of PCT/JP2022/006017 filed on Feb. 15, 2022, which claims foreign priority of Japanese Patent Application No. 2021-072032 filed on Apr. 21, 2021, the entire contents of both of which are incorporated herein by reference.

BACKGROUND OF THE INVENTION

1. Field of the Invention

The present invention relates to a dielectric, a capacitor, an electrical circuit, a circuit board, and an apparatus.

2. Description of Related Art

Dielectric properties have been examined for tantalum compounds containing fluorine and oxygen.

For example, according to Non Patent Literature 1, a thin polycrystalline $TaO_2F$ film has a dielectric constant of 60 at 1 MHz.

SUMMARY OF THE INVENTION

Technical Problem

Journal of Materials Chemistry C, (UK), 2020, Issue 14, pp. 4680-4684 describes only the dielectric constant of a thin polycrystalline $TaO_2F$ film in relation to dielectric properties of a tantalum compound containing fluorine and oxygen. Therefore, the present disclosure provides a dielectric including a tantalum compound containing fluorine and oxygen, the tantalum compound not being polycrystalline, the dielectric being advantageous in terms of achieving a high dielectric constant.

A dielectric of the present disclosure includes a tantalum compound containing fluorine and oxygen and being amorphous.

According to the present disclosure, a dielectric including a tantalum compound containing fluorine and oxygen can be provided, the tantalum compound not being polycrystalline, the dielectric being advantageous in terms of achieving a high dielectric constant.

DETAILED DESCRIPTION

Findings on which the Present Disclosure is Based

With recent advances of electronic devices, further improvement in performance is required of electronic components configured to be mounted in electronic devices. For example, improvement of capacitors in performance is particularly important, and small high-capacity capacitors can have high value.

Known capacitors are electrolytic capacitors such as aluminum electrolytic capacitors and tantalum electrolytic capacitors. These electrolytic capacitors are manufactured by forming a thin oxide film dielectric by a chemical conversion treatment of aluminum or tantalum. As the materials of the electrolytic capacitors are basically fixed, a method by which mainly the specific surface areas of dielectrics are increased is conventionally adopted to increase the capacities of electrolytic capacitors. However, this method is approaching a limit in terms of increasing the capacities of capacitors. It is then conceivable to create a new material having a high dielectric constant to increase the capacities of capacitors.

It is understood from Journal of Materials Chemistry C, (UK), 2020, Issue 14, pp. 4680-4684 that a thin polycrystalline $TaO_2F$ film has a high dielectric constant. It is thought that a difference in crystal state between polycrystalline $TaO_2F$ and tantalum oxide $Ta_2O_5$ results in a difference in degree of polarization between dielectrics formed thereof and thus polycrystalline $TaO_2F$ has a higher dielectric constant. Incidentally, Journal of Materials Chemistry C, (UK), 2020, Issue 14, pp. 4680-4684 fails to discuss a tantalum compound containing fluorine and oxygen and not being polycrystalline.

Therefore, the present inventors made intensive studies on the dielectric properties of a tantalum compound containing fluorine and oxygen and not being polycrystalline. Through a lot of trial and error, the present inventors have gained a new finding that an amorphous tantalum compound containing fluorine and oxygen is advantageous in terms of achieving a high dielectric constant. On the basis of this new finding, the present inventors have devised a dielectric of the present disclosure.

Summary of One Aspect According to the Present Disclosure

A dielectric according to a first aspect of the present disclosure includes a tantalum compound containing fluorine and oxygen and being amorphous.

The dielectric according to the first aspect is likely to have a high dielectric constant.

According to a second aspect of the present disclosure, for example, in the dielectric according to the first aspect, two peaks may be present in an interatomic distance range from 1 to 2 angstroms in a radial distribution function for a vicinity of a tantalum atom of the tantalum compound.

According to the second aspect, the dielectric is likely to have a high dielectric constant more reliably.

According to a third aspect of the present disclosure, for example, in the dielectric according to the second aspect, a peak corresponding to a first neighboring atom and a peak corresponding to a second neighboring atom may be present in the interatomic distance range from 1 to 2 angstroms in the radial distribution function. According to the third aspect, the dielectric is likely to have a high dielectric constant more reliably.

According to a fourth aspect of the present disclosure, for example, in the dielectric according to the second or third aspect, a first peak at which an existence probability is highest and a second peak at which the existence probability is lower than the existence probability at the first peak may be present in the interatomic distance range from 1 to 2 angstroms in the radial distribution function. According to the fourth aspect, the dielectric is likely to have a high dielectric constant more reliably.

According to a fifth aspect of the present disclosure, for example, in the dielectric according to any one of the second to fourth aspects, in the interatomic distance range from 1 to 2 angstroms (Å) in the radial distribution function for the vicinity of the tantalum atom of the tantalum compound, a difference between a first peak value representing a highest existence probability and a second peak value representing a second highest existence probability may be 3.5 or less. According to the fifth aspect, the dielectric is likely to have a high dielectric constant more reliably.

According to a sixth aspect of the present disclosure, for example, in the dielectric according to any one of the first to fifth aspects, the tantalum compound may have a composition represented by $TaO_xF_y$. Additionally, the composition may satisfy requirements $0<x<2.5$ and $0<y\leq0.4$. According to the sixth aspect, the dielectric is likely to have a high dielectric constant more reliably.

According to a seventh aspect of the present disclosure, for example, in the dielectric according to the sixth aspect, the composition may satisfy a requirement $y>0.141$. According to the seventh aspect, the dielectric is more likely to have a high dielectric constant.

According to an eighth aspect of the present disclosure, the dielectric according to any one of the first to seventh aspects may have a dielectric constant of 26 or more at 100 Hz. According to the eighth aspect, for example, the dielectric has a dielectric constant advantageous in terms of providing a small high-capacity capacitor.

A capacitor according to a ninth aspect of the present disclosure includes:
a first electrode;
a second electrode; and
the dielectric according to any one of the first to eighth aspects disposed between the first electrode and the second electrode.

According to the ninth aspect, the dielectric is likely to have a high dielectric constant, and the capacitor is likely to have a high capacity.

According to a tenth aspect of the present disclosure, for example, the capacitor according to the ninth aspect may further include an electrolyte disposed between the first electrode and the second electrode. According to the eleventh aspect, the capacitor including the electrolyte is likely to have a high capacity.

According to an eleventh aspect of the present disclosure, for example, in the capacitor according to the tenth aspect, the electrolyte may include at least one selected from the group consisting of an electrolyte solution and an electrically conductive polymer. According to the eleventh aspect, the capacity of the capacitor is high and, for example, in the case of including the electrically conductive polymer, a stable capacitor having a low equivalent series resistance (ESR) can be produced.

According to a twelfth aspect of the present disclosure, for example, in the capacitor according to the tenth aspect, the electrolyte may include a solid electrolyte. According to the twelfth aspect, evaporation and drying up of an electrolyte solution does not occur, which can extend the life of the capacitor.

An electrical circuit according to a thirteenth aspect of the present disclosure includes the capacitor according to any one of the ninth to twelfth aspects. According to the thirteenth aspect, the capacitor is likely to have a high capacity, and the electrical circuit is likely to have improved properties.

A circuit board according to a fourteenth aspect of the present disclosure includes the capacitor according to any one of the ninth to twelfth aspects. According to the fourteenth aspect, the capacitor is likely to have a high capacity, and the circuit board is likely to have improved properties.

An apparatus according to a fifteenth aspect of the present disclosure includes the capacitor according to any one of the ninth to twelfth aspects. According to the fifteenth aspect, the capacitor is likely to have a high capacity, and the apparatus is likely to have improved properties.

EMBODIMENTS

Embodiments of the present disclosure will be described hereinafter with reference to the drawings. The present disclosure is not limited to the following embodiments.

Figure 1A:
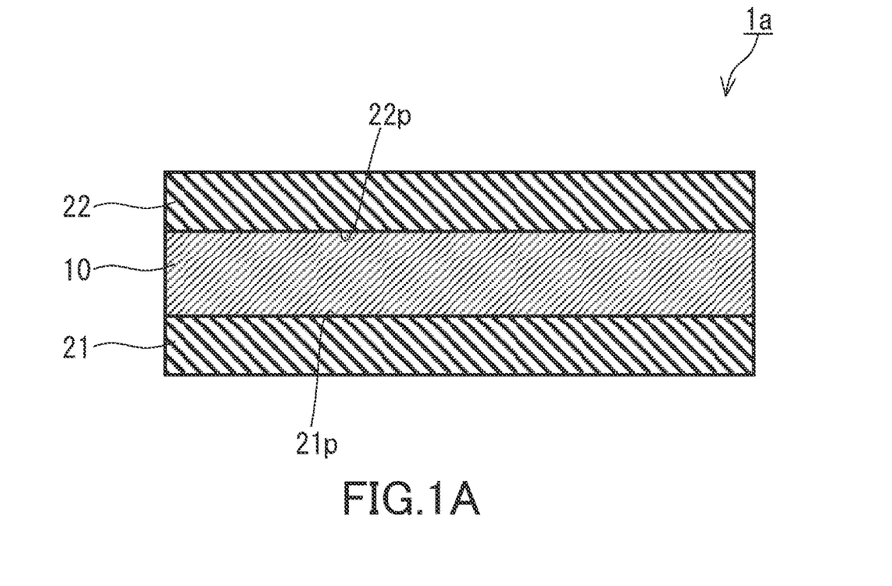
FIG. 1A is a cross-sectional view of a capacitor according to an embodiment of the present disclosure.

FIG. 1A is a cross-sectional view showing a capacitor 1*a* according to an example of an embodiment of the present disclosure. As shown in FIG. 1A, the capacitor 1*a* includes a dielectric 10. In other words, the dielectric 10 is a material of the capacitor. The dielectric 10 includes a tantalum compound containing fluorine and oxygen and being amorphous. In other words, the tantalum compound included in the dielectric 10 is an amorphous tantalum oxyfluoride. With such structural features, the dielectric 10 is likely to have a high dielectric constant, and the capacitor 1*a* is likely to have a high capacity. Moreover, occurrence of a leak current attributable to a grain boundary is likely to be reduced in the dielectric 10. For example, when a broad halo pattern appears in an XRD pattern obtained from a dielectric using a Cu-Kα ray at diffraction angles from 10° to 50°, a compound included in the dielectric is concluded to be amorphous.

The dielectric constant of the dielectric 10 is not limited to a particular value. The dielectric constant of the dielectric 10 is, for example, higher than the dielectric constant of tantalum oxide $Ta_2O_5$. The dielectric constant of the dielectric 10 at 100 Hz is, for example, 25 or more, desirably 26 or more, more desirably 30 or more, even more desirably 35 or more, particularly desirably 40 or more. The dielectric constant of the dielectric 10 is, for example, a value measured at 25° C.

A distribution of atoms in the tantalum compound included in the dielectric 10 is not limited to a particular relation as long as the tantalum compound is an amorphous compound containing fluorine and oxygen. For example, two peaks are present in an interatomic distance range from 1 to 2 Å in a radial distribution function for a vicinity of a tantalum atom of the tantalum compound. With such a structural feature, the dielectric is likely to have a high dielectric constant more reliably. The radial distribution function can be calculated in the following manner. First, an X-ray fluorescence profile of the tantalum compound is obtained, and the profile is plotted in terms of wavenumber. Using XAFS analysis software Athena, fitting of the resulting data is performed to normalize the data on the basis of polynomials in a theoretical expression of an extended X-ray absorption fine structure (EXAFS) for one shell. The normalized data is further Fourier transformed to calculate a radial distribution function.

A peak corresponding to a first neighboring atom and a peak corresponding to a second neighboring atom may be present in the interatomic distance range from 1 to 2 Å in the radial distribution function for the vicinity of a tantalum atom of the tantalum compound. With such a structural feature, the dielectric 10 is likely to have a high dielectric constant more reliably.

A first peak at which an existence probability is highest and a second peak at which the existence probability is lower than the existence probability at the first peak may be present in the interatomic distance range from 1 to 2 Å in the radial distribution function for the vicinity of a tantalum atom of the tantalum compound. With such a structural feature, the dielectric 10 is likely to have a high dielectric constant more reliably.

A difference between a first peak value and a second peak value may be 3.5 or less in the radial distribution function in the vicinity of a tantalum atom of the tantalum compound. The first peak value is a peak value representing a highest existence probability in the interatomic distance range from 1 to 2 Å in the radial distribution function. The second peak value is a peak value representing a second highest existence probability in the interatomic distance range from 1 to 2 Å in the radial distribution function. With such a structural feature, the dielectric 10 is likely to have a high dielectric constant more reliably.

The difference between the first peak value and the second peak value may be 3 or less, or 2.5 or less in the interatomic distance range from 1 to 2 Å in the radial distribution function for the vicinity of a tantalum atom of the tantalum compound included in the dielectric 10.

The composition of the tantalum compound included in the dielectric 10 is not limited to a particular composition as long as the tantalum compound contains fluorine and oxygen and is amorphous. The tantalum compound has, for example, a composition represented by $TaO_xF_y$. This composition satisfies requirements $0<x<2.5$ and $0<y\le0.4$. With such a structural feature, the dielectric 10 is likely to have a high dielectric constant more reliably. This composition may satisfy a requirement $0<x<2.50$. This composition may satisfy a requirement $0<y<0.40$.

The above composition may satisfy a requirement $0<y\le0.1$. With such a structural feature, it is likely that the amount of fluorine in the tantalum compound is maintained low and that the dielectric 10 has a high dielectric constant more reliably.

The above composition may satisfy a requirement $y\ge0.01$. In this case, the dielectric 10 is likely to have a high dielectric constant more reliably.

The above composition may satisfy a requirement $y>0.141$. The above composition may satisfy a requirement $y\ge0.15$, $y\ge0.2$, or $y\ge0.3$.

The dielectric 10 may include, as a minor component, a component other than the tantalum compound containing fluorine and oxygen and being amorphous. The minor component is, for example, carbon. The minor component content in the dielectric 10 is 5 mol % or less.

As shown in FIG. 1A, in the capacitor 1a, the dielectric 10 is formed, for example, as a film. The dielectric 10 is, for example, a sputtered film. In this case, the dielectric 10 can be formed by sputtering. For example, the dielectric 10 is obtained by sputtering using tantalum oxide $Ta_2O_5$ as a target material in an atmosphere containing a fluorine gas. The dielectric 10 may be formed by anodic oxidation. For example, the dielectric 10 is obtained by generating, for anodic oxidation, an electric current between an anode and a cathode each in contact with a fluoride-containing solution, the anode consisting of tantalum as an elementary substance.

As shown in FIG. 1A, the capacitor 1a further includes a first electrode 21 and a second electrode 22. The dielectric 10 is disposed between the first electrode 21 and the second electrode 22.

The material of the first electrode 21 and the second electrode 22 may include, for example, a valve metal. The first electrode 21 may include, for example, Ta as the valve metal. The first electrode 21 may include a noble metal such as gold or platinum.

The second electrode 22 may include a valve metal such as Al, Ta, Nb, or Bi, may include a noble metal such as gold or platinum, or may include nickel. The second electrode 22 may include graphite.

As shown in FIG. 1A, the first electrode 21 has a principal surface 21p. One principal surface of the dielectric 10 is, for example, in contact with the principal surface 21p. The second electrode 22 has a principal surface 22p parallel to the principal surface 21p. The other principal surface of the dielectric 10 is, for example, in contact with the principal surface 22p.

Figure 1B:
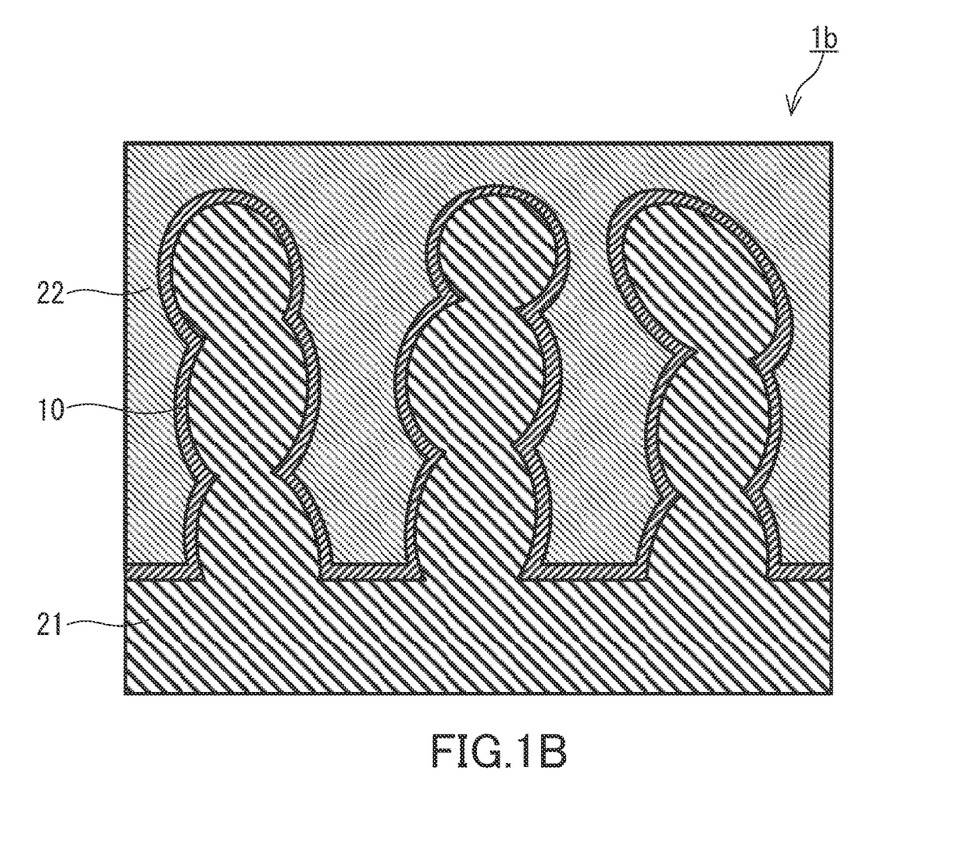
FIG. 1B is a cross-sectional view of a capacitor according to another embodiment of the present disclosure.

FIG. 1B is a cross-sectional view showing a capacitor 1b according to another example of the embodiment of the present disclosure. The capacitor 1b is configured in the same manner as the capacitor 1a unless otherwise described. The components of the capacitor 1b that are the same as or correspond to the components of the capacitor 1a are denoted by the same reference characters, and detailed descriptions of such components are omitted. The description given for the capacitor 1a is applicable to the capacitor 1b unless there is a technical inconsistency.

As shown in FIG. 1B, at least a portion of the first electrode 21 is a porous portion in the capacitor 1b. This structural feature is likely to increase the surface area of the first electrode 21 and the capacitance of the capacitor. The porous structure can be formed, for example, by etching of a metallic foil, sintering of powder, or the like.

As shown in FIG. 1B, for example, the film of the dielectric 10 is arranged on a surface of the porous portion of the first electrode 21. In this case, anodization or atomic layer deposition (ALD) can be adopted as the method for forming the film of the dielectric 10.

In the capacitor 1b, the second electrode 22 is disposed, for example, to fill a space around the porous portion of the first electrode 21.

The second electrode 22 may include, for example, a valve metal such as Al, Ta, Nb, or Bi, may include a noble metal such as gold, silver, or platinum, or may include nickel. The second electrode 22 includes, for example, at least one selected from the group consisting of Al, Ta, Nb, gold, silver, platinum, and nickel.

Figure 1C:
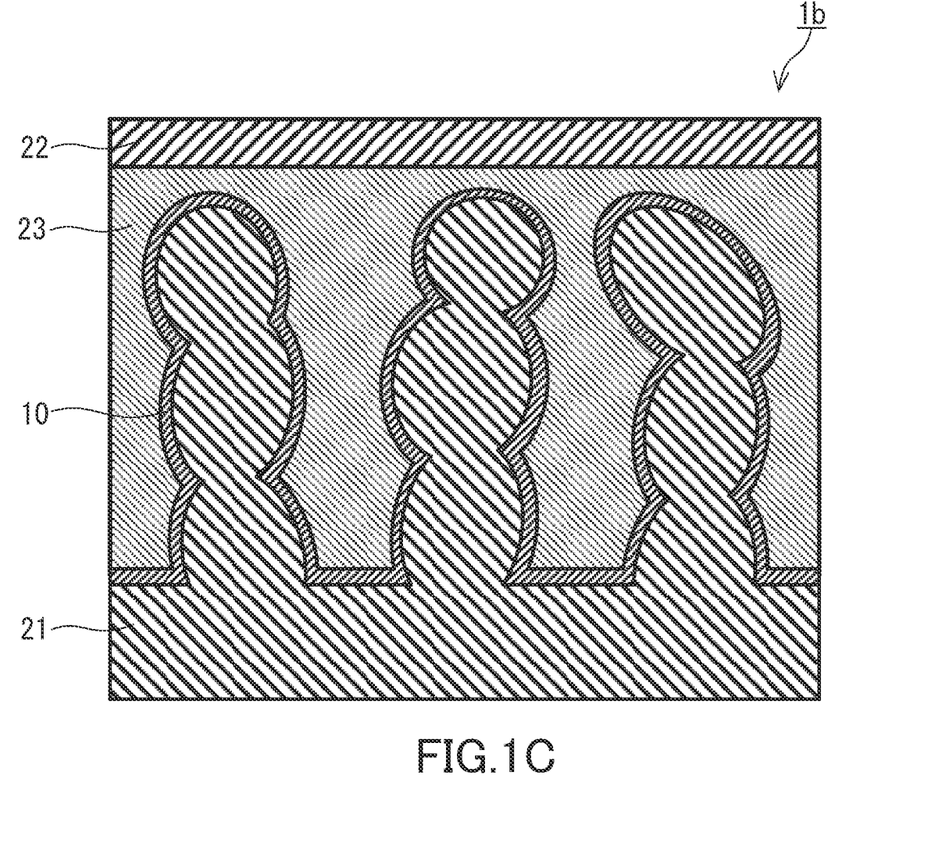
FIG. 1C is a cross-sectional view of a variant of the capacitor shown in FIG. 1B.

The capacitors 1a and 1b may be electrolytic capacitors. In this case, for example, an electrolyte 23 is disposed between the first electrode 21 and the second electrode 22. The electrolyte 23 may be disposed between the dielectric 10 and the second electrode 22. FIG. 1C shows a variant of the capacitor 1b configured as an electrolytic capacitor. In the capacitor 1b, the electrolyte 23 is disposed, for example, to fill the space around the porous portion of the first electrode 21.

The electrolyte includes, for example, at least one selected from the group consisting of an electrolyte solution and an electrically conductive polymer. Examples of the electrically conductive polymer include polypyrrole, polythiophene, polyaniline, and derivatives of these. The electrolyte may be made of a manganese compound such as manganese oxide. The electrolyte may include a solid electrolyte.

Figure 2A:
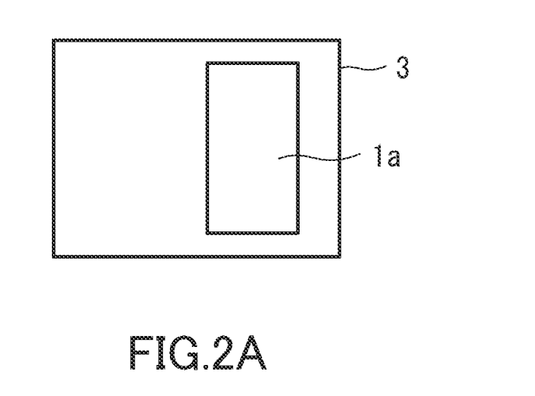
FIG. 2A schematically shows an electrical circuit according to an embodiment of the present disclosure.

FIG. 2A schematically shows an electrical circuit 3 according to the embodiment of the present disclosure. As shown in FIG. 2A, the electrical circuit 3 includes the capacitor 1a. The electrical circuit 3 is not limited to a particular circuit as long as the electrical circuit 3 includes the capacitor 1a. The electrical circuit 3 may be an active circuit or a passive circuit. The electrical circuit 3 may be a discharging circuit, a smoothing circuit, a decoupling circuit, or a coupling circuit. Since the electrical circuit 3 includes the capacitor 1a, the electrical circuit 3 is likely to have desired properties. For example, it is likely that the capacitor 1a reduces noise in the electrical circuit 3. The electrical circuit 3 may include the capacitor 1b.

Figure 2B:
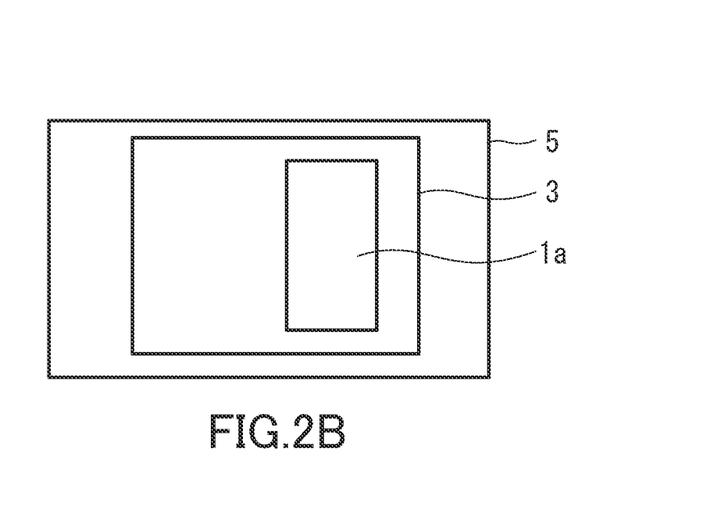
FIG. 2B schematically shows a circuit board according to an embodiment of the present disclosure.

FIG. 2B schematically shows a circuit board 5 according to the embodiment of the present disclosure. As shown in FIG. 2B, the circuit board 5 includes the capacitor 1a. The circuit board 5 is not limited to a particular circuit board as long as the circuit board 5 includes the capacitor 1a. The circuit board 5 includes, for example, the electrical circuit 3. The circuit board 5 may be an embedded board or a motherboard. The circuit board 5 may include the capacitor 1b.

Figure 2C:
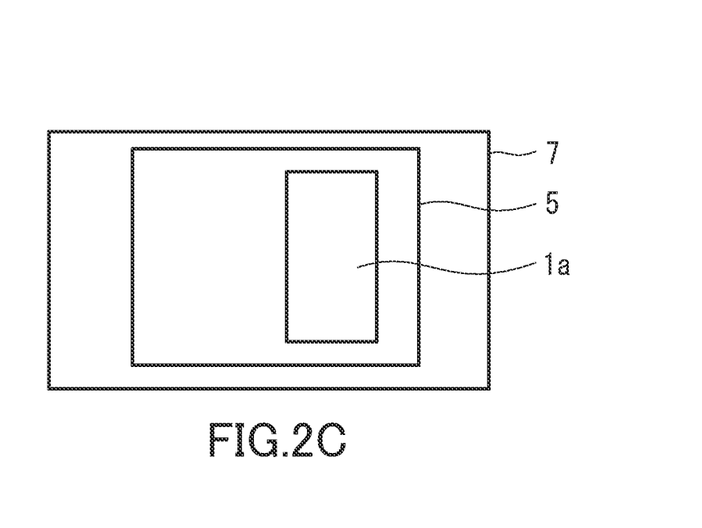
FIG. 2C schematically shows an apparatus according to an embodiment of the present disclosure.

FIG. 2C schematically shows an apparatus 7 according to the embodiment of the present disclosure. As shown in FIG. 2C, the apparatus 7 includes the capacitor 1a. The apparatus 7 is not limited to a particular apparatus as long as the apparatus 7 includes the capacitor 1a. The apparatus 7 includes, for example, the circuit board 5. The apparatus 7 may be an electronic device, a communication device, a signal-processing device, or a power-supply device. The apparatus 7 may be a server, an AC adapter, an accelerator, or a flat-panel display such as a liquid crystal display (LCD). The apparatus 7 may be a USB charger, a solid-state drive (SSD), an information terminal such as a PC, a smartphone, or a tablet PC, or an Ethernet switch. The apparatus 7 may include the capacitor 1b.

EXAMPLES

Hereinafter, the present disclosure will be described in more detail with reference to examples. The examples given below are just examples, and the present disclosure is not limited to them.

Example 1

An ITO-coated glass substrate having a principal surface formed of indium tin oxide (ITO) was subjected to RF magnetron sputtering using $Ta_2O_5$ as a target material in an atmosphere containing a fluorine gas. A dielectric was thereby formed on the principal surface formed of ITO of the ITO-coated glass substrate. In the RF magnetron sputtering, the ITO-coated glass substrate was heated at 380° C. RF magnetron sputtering conditions were adjusted so that a ratio of the number of fluorine atoms to the number of tantalum atoms would be 0.08 in the dielectric. Next, a gold electrode was formed on the dielectric by vacuum deposition. A capacitor according to Example 1 was produced in this manner.

Example 2

A capacitor according to Example 2 was produced in the same manner as in Example 1, except that the RF magnetron sputtering conditions were adjusted so that the ratio of the number of fluorine atoms to the number of tantalum atoms would be 0.05 in the dielectric.

Example 3

A tantalum plate connected with a positive terminal of a power-supply device and Pt connected with a negative terminal of the power-supply device were placed with a given space therebetween in an aqueous solution containing NaF and NaOH. The NaF concentration in the aqueous solution was 0.47 mol/liter (L), and the NaOH concentration in the aqueous solution was 0.0001 mol/L. Next, a constant electric current was applied between the tantalum serving as an anode and the Pt serving as a cathode using the power-supply device to cause an electrochemical reaction on a surface of the tantalum for anodic oxidation. A dielectric was thereby formed on the tantalum. In the anodic oxidation, the electric current was 0.003 A, and the voltage was 100 kV. In the anodic oxidation, the voltage setting was maintained for 10 minutes after reached. A gold electrode was formed on the dielectric by vacuum deposition, as in Example 1. A capacitor according to Example 3 was produced in this manner. The ratio of the number of fluorine atoms to the number of tantalum atoms was 0.37 in the dielectric of the capacitor according to Example 3.

Comparative Example

A capacitor according to Comparative Example was produced in the same manner as in Example 3, except that an aqueous NaOH solution was used instead of the aqueous solution containing NaF and NaOH. The NaOH concentration in the aqueous NaOH solution was 0.0001 mol/L.

(Elemental Composition Analysis)

Specimens produced from the dielectrics of the capacitors according to Examples and Comparative Example were subjected to Rutherford backscattering spectroscopy (RBS) using a RBS analyzer Pelletron 5SDH-2. In the RBS, an ion beam was applied to the specimens under given conditions to obtain RBS spectra. The ratio of the number of fluorine atoms to the number of tantalum atoms in each dielectric was determined from each RBS spectrum.

(X-Ray Diffraction)

Figure 3A:
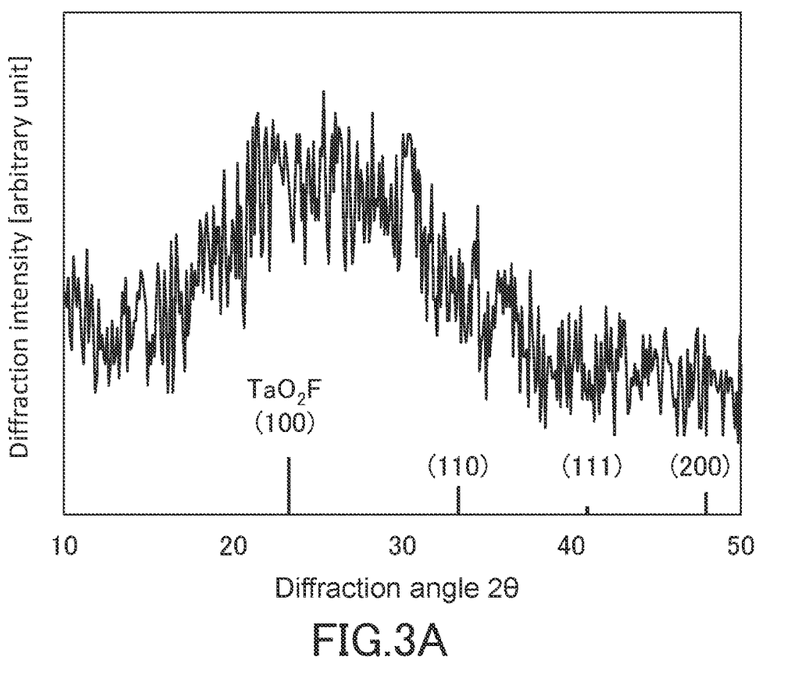
FIG. 3A shows an X-ray diffraction (XRD) pattern of a dielectric of a capacitor according to Example 1.
Figure 3B:
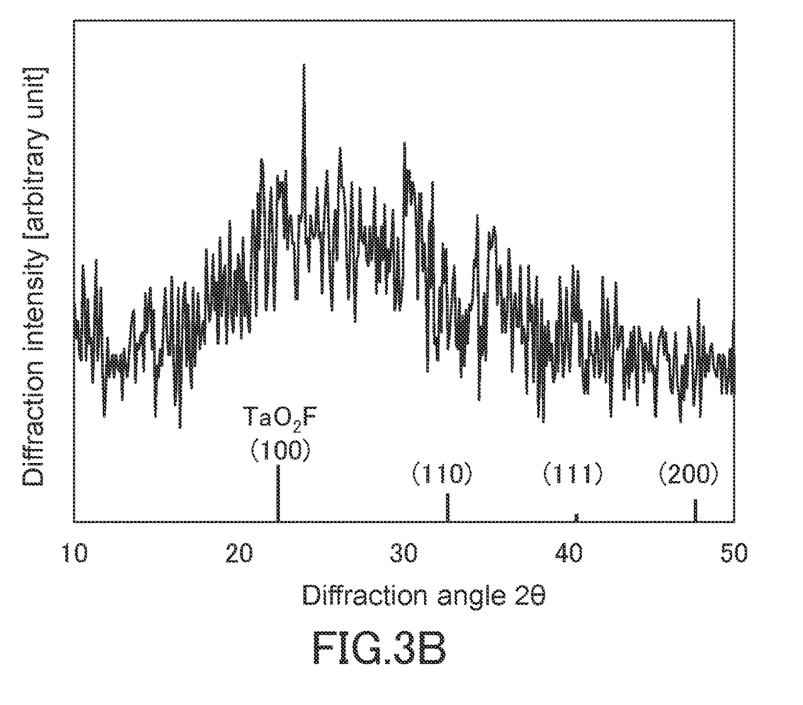
FIG. 3B shows an XRD pattern of a dielectric of a capacitor according to Example 3.

XRD patterns of specimens produced from the dielectrics of the capacitors according to Examples 1 and 3 were obtained by 2θ/θ scan using an X-ray diffractometer Smartlab manufactured by Rigaku Corporation. A Cu-Kα ray was used as an X-ray source, and the voltage and the current were respectively adjusted to 40 kV and 30 mA. The Cu-Kα ray had a wavelength of 0.15418 nm. FIG. 3A shows the XRD pattern of the dielectric of the capacitor according to Example 1. FIG. 3B shows the XRD pattern of the dielectric of the capacitor according to Example 3. In FIGS. 3A and 3B, the vertical axis represents the diffraction intensity, while the horizontal axis represents the diffraction angle. As shown in FIGS. 3A and 3B, a broad profile was confirmed across each of these XRD patterns. This means that the tantalum compounds included in the dielectrics of the capacitors according to Examples 1 and 3 are amorphous.

(Dielectric Properties)

The capacitors according to Examples and Comparative Example were subjected to an AC impedance measurement. An amplitude of voltage in the AC impedance measurement was adjusted within the range of 10 to 100 mV. An AC voltage was applied to each capacitor in the range from 0.1 Hz to 1 MHz. A cross-section of the dielectric of each capacitor was observed using a scanning electron microscope (SEM), and an arithmetic average of thickness values measured at three or more points randomly selected in a SEM image of the cross-section of the dielectric was defined as the thickness of the dielectric. From resistance values measured at the frequencies in the AC impedance measurement and the thickness of the dielectric, the dielectric constant of the tantalum compound forming the dielectric was determined. The AC impedance measurement was performed in an environment at room temperature.

Figure 4:
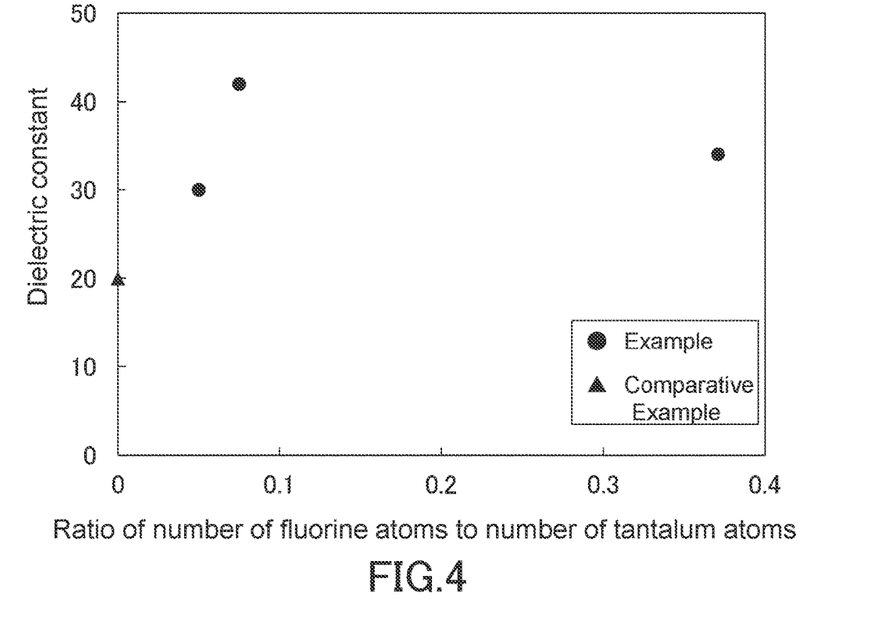
FIG. 4 is a graph showing a relation between a dielectric constant of each of tantalum compounds forming dielectrics of capacitors according to Examples and Comparative Example and a ratio of the number of fluorine atoms to the number of tantalum atoms in each of the tantalum compounds.

FIG. 4 shows a relation between the dielectric constant at 100 Hz of each of the tantalum compounds forming the dielectrics of the capacitors according to Examples and Comparative Example and the ratio of the number of fluorine atoms to the number of tantalum atoms in each of the dielectrics. In FIG. 4, the vertical axis represents the dielectric constant, while the horizontal axis represents the ratio of the number of fluorine atoms to the number of tantalum atoms. As shown in FIG. 4, the dielectric constants of the fluorine-containing tantalum compounds forming the dielectrics of the capacitors according to Examples are higher than the dielectric constant of the fluorine-free tantalum oxide forming the dielectric of the capacitor according to Comparative Example. This indicates that the tantalum compound containing fluorine is advantageous in terms of achieving a high dielectric constant.

The dielectric constant of the fluorine-containing tantalum compound forming the dielectric of the capacitor according to Example 1 is higher than the dielectric constant of the fluorine-containing tantalum oxide forming the dielectric of the capacitor according to Example 3. This is presumably due to, for example, a microscopic difference in layout of atoms attributable to the different dielectric forming methods.

(Radial Distribution Function)

Specimens produced from the dielectrics of the capacitors according to Example 1, Example 3, and Comparative Example were subjected to X-ray absorption fine structure (XAFS) analysis using an X-ray absorption spectrometer at Aichi Synchrotron Radiation Center to obtain XAFS spectra of the K-edge of tantalum. From each of these XAFS spectra, a radial distribution function in the vicinity of a tantalum atom of the tantalum compound forming the dielectric was obtained.

Figure 5:
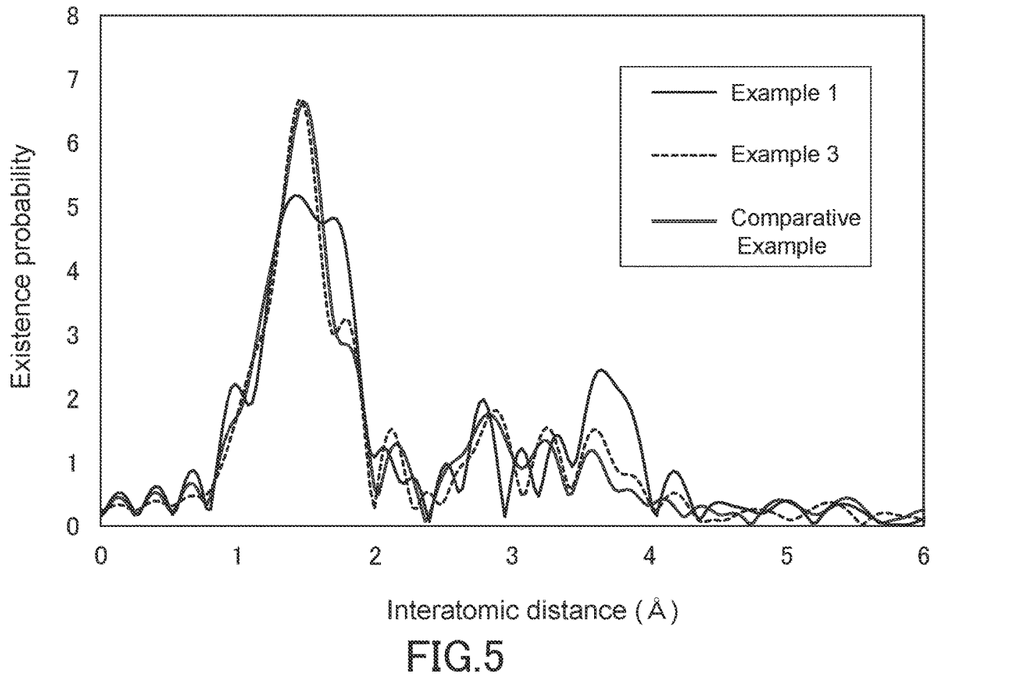
FIG. 5 is a graph showing a radial distribution function for a vicinity of a tantalum atom of each of the tantalum compounds forming the dielectrics of the capacitors according to Example 1, Example 3, and Comparative Example.

FIG. 5 is a graph showing the radial distribution functions of the tantalum compounds forming the dielectrics of the capacitors according to Example 1, Example 3, and Comparative Example. In FIG. 5, the vertical axis represents the existence probability of atoms, while the horizontal axis represents the interatomic distance. Each radial distribution function was calculated in the following manner. First, an X-ray fluorescence profile was obtained and plotted in terms of wavenumber. Using XAFS analysis software Athena, fitting of the data resulting from the plotting was performed to normalize the data on the basis of the polynomials in the theoretical expression of an EXAFS for one shell. The data resulting from the normalization was further Fourier transformed to calculate a radial distribution function. As shown in FIG. 5, the radial distribution functions of the tantalum compounds forming the dielectrics of the capacitors according to Example 1, Example 3, and Comparative Example each have a plurality of peak values in the interatomic distance range from 1 to 2 Å. In the interatomic distance range from 1 to 2 Å in each of the radial distribution functions for the tantalum compounds forming the dielectrics according to Examples 1 and 3, the difference between the peak value representing the highest existence probability and the peak value representing the second highest existence probability is 3.5 or less. On the other hand, in the interatomic distance range from 1 to 2 Å in the radial distribution function for the tantalum compound forming the dielectric according to Comparative Example, the difference between the peak value representing the highest existence probability and the peak value representing the second highest existence probability is more than 3.5. It is understood that the peaks in the interatomic distance range from 1.7 to 2.0 Å in the radial distribution function correspond to an atomic bond length between a tantalum atom and an oxygen atom. It is thought that a difference in local structure in the vicinity of a tantalum atom between the tantalum compounds forming the dielectrics of the capacitors according to Examples 1 and 3 and the tantalum compound forming the dielectric of the capacitor according to Comparative Example caused the difference in dielectric constant.

As shown in FIG. 5, the radial distribution function for the tantalum compound forming the dielectric of the capacitor according to Example 1 shows a higher existence probability in the interatomic distance ranges from 1.7 to 2.0 Å and from 3.5 to 4.0 Å than those in the radial distribution functions for Example 3 and Comparative Example. The local structure in the vicinity of a tantalum atom of the tantalum compound forming the dielectric of the capacitor according to Example 1 is thought to be related to the high dielectric constant.

INDUSTRIAL APPLICABILITY

The dielectric of the present disclosure is suitable for electronic components such as electrolytic capacitors.

What is claimed is:

1. A dielectric comprising a tantalum compound containing fluorine and oxygen, the tantalum compound being amorphous, wherein:
the tantalum compound has a composition represented by $TaO_xF_y$, and
the composition satisfies requirements $0<x<2.5$ and $0<y\leq0.4$.

2. The dielectric according to claim 1, wherein two peaks are present in an interatomic distance range from 1 to 2 angstroms in a radial distribution function for a vicinity of a tantalum atom of the tantalum compound.

3. The dielectric according to claim 2, wherein a peak corresponding to a first neighboring atom and a peak corresponding to a second neighboring atom are present in the interatomic distance range from 1 to 2 angstroms in the radial distribution function.

4. The dielectric according to claim 2, wherein a first peak at which an existence probability is highest and a second peak at which the existence probability is lower than the existence probability at the first peak are present in the interatomic distance range from 1 to 2 angstroms in the radial distribution function.

5. The dielectric according to claim 2, wherein in the interatomic distance range from 1 to 2 angstroms in the radial distribution function, a difference between a first peak value representing a highest existence probability and a second peak value representing a second highest existence probability is 3.5 or less.

6. The dielectric according to claim 1, wherein the composition satisfies a requirement y>0.141.

7. The dielectric according to claim 1, wherein the dielectric has a dielectric constant of 26 or more at 100 Hz.

8. A capacitor comprising:
a first electrode;
a second electrode; and
a dielectric disposed between the first electrode and the second electrode,
wherein the dielectric comprises a tantalum compound containing fluorine and oxygen, the tantalum compound being amorphous.

9. The capacitor according to claim 8, further comprising an electrolyte disposed between the first electrode and the second electrode.

10. The capacitor according to claim 9, wherein the electrolyte includes at least one selected from the group consisting of an electrolyte solution and an electrically conductive polymer.

11. The capacitor according to claim 9, wherein the electrolyte includes a solid electrolyte.

12. An electrical circuit comprising the capacitor according to claim 8, wherein the capacitor is mounted to the electrical circuit.

13. A circuit board comprising the capacitor according to claim 8, wherein the capacitor is mounted to an electrical circuit formed on the circuit board.

14. An apparatus comprising the capacitor according to claim 8, wherein:
the capacitor is mounted to an electrical circuit formed on a circuit board, and
the apparatus is equipped with the circuit board.

15. A dielectric comprising a tantalum compound containing fluorine and oxygen, the tantalum compound being amorphous, wherein:
two peaks are present in an interatomic distance range from 1 to 2 angstroms in a radial distribution function for a vicinity of a tantalum atom of the tantalum compound.

16. The dielectric according to claim 15, wherein a peak corresponding to a first neighboring atom and a peak corresponding to a second neighboring atom are present in the interatomic distance range from 1 to 2 angstroms in the radial distribution function.

17. The dielectric according to claim 15, wherein a first peak at which an existence probability is highest and a second peak at which the existence probability is lower than the existence probability at the first peak are present in the interatomic distance range from 1 to 2 angstroms in the radial distribution function.

18. The dielectric according to claim 15, wherein in the interatomic distance range from 1 to 2 angstroms in the radial distribution function, a difference between a first peak value representing a highest existence probability and a second peak value representing a second highest existence probability is 3.5 or less.

* * * * *